Dec. 1, 1953          M. ABRAMS          2,660,828
TIME CONTROLLED DEMOTHIZING DEVICE
Filed Jan. 6, 1951          2 Sheets-Sheet 1
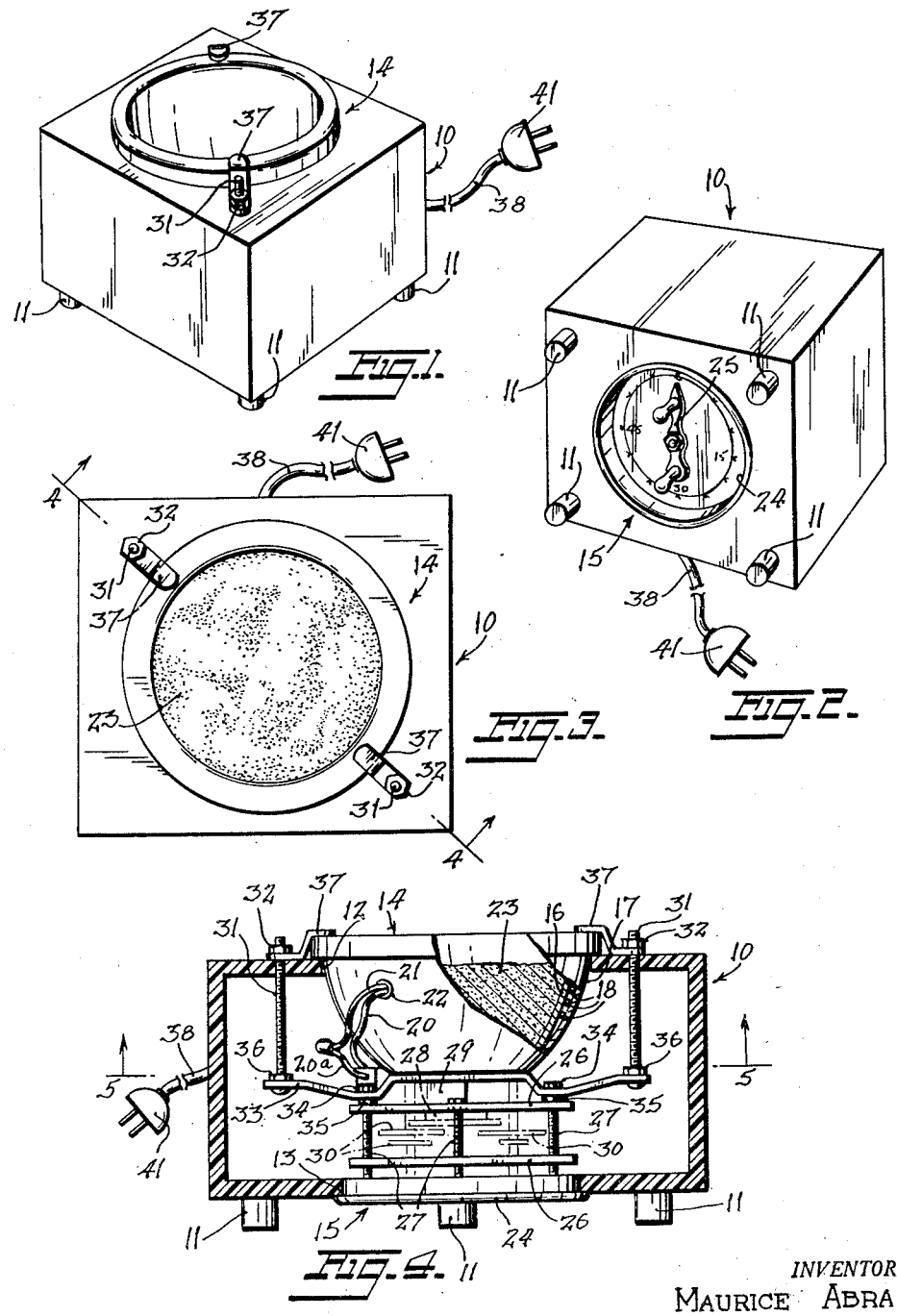
INVENTOR.
MAURICE ABRAMS
BY
ATTORNEY Dec. 1, 1953  M. ABRAMS  2,660,828
TIME CONTROLLED DEMOTHIZING DEVICE
Filed Jan. 6, 1951  2 Sheets-Sheet 2

INVENTOR.
MAURICE ABRAMS
BY
ATTORNEY

Patented Dec. 1, 1953

2,660,828

UNITED STATES PATENT OFFICE 2,660,828

TIME CONTROLLED DEMOTHIZING DEVICE

Maurice Abrams, Newark, N. J.

Application January 6, 1951, Serial No. 204,763

3 Claims. (Cl. 43—129)

This invention relates to new and useful improvements in means for protecting such items as clothing, furniture, rugs, from moths, eggs, larvae and the like.

Such means are known which employ a chemical, electrically heated to provide an insecticide vapor. One fault with devices of this type, however, is that the user connects the same to a source of electrical power, places the same in a closet or the like, and then forgets about the device. This, of course, results in overheating of the device and damage to it or to the articles being demothed.

One object of the invention is the provision of such a device having means to cut off the supply of electrical power to the heating means automatically after a predetermined period of time.

Another object of the invention is to construct and arrange the unit so that the timing device, the chemical supply and the heating element all are contained in an easily portable unit adapted to be placed on the floor of a closet or the like.

Still another object of the invention is the provision of mounting means for the heating unit which include safeguards against overheating of the power cutoff device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the device of the invention, particularly illustrating the heating unit.

Fig. 2 is a perspective view of the device particularly illustrating the power cutoff means.

Fig. 3 is a plan view of the device.

Fig. 4 is a vertical sectional view along line 4—4 of Fig. 3.

Figure 5:
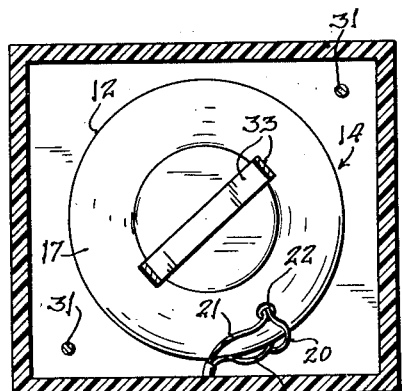
Fig. 5 is a horizontal sectional view along line 5—5 of Fig. 4.

The time controlled demothizing device, according to the first form of the present invention shown in Figs. 1 to 5, includes a box 10 of any suitable plastic material supported on stubby legs or blocks 11. Circular openings 12 and 13 are provided in the top and bottom respectively of the box, the former to receive a heating container unit 14 for the fumigant chemical, and the latter a timing unit 15.

Container 14 comprises inner and outer shells 16 and 17 secured together at their edges by rolling or the like. The side portions of inner shell 16 are located some distance from those of the outer shell 17 and a heating coil 18 is located in the space therebetween. Suitable electric leads 20 and 21 extend from coil 18 through a suitable opening 22 in the outer shell 17.

As shown, the inner shell 16 contains a quantity of normally solid fumigant chemical 23 which when heated gives off a vapor deadly to moths and the like. Preferably paradichlorobenzene which has a melting point of about 55° C. is employed.

The timing device 15 is of the usual construction and includes a dial plate 24 having time period indicia thereon, a pointer 25 rotatable about said dial face, a pair of spaced frame plates 26 located within the box 10 and spaced apart by bolts 27, a spring motor 28 and gearing 30 mounted between said frame plates, and an electrical contact unit 29 operated in accordance with the setting of said pointer. The timing device is secured in the box 10 by means of a pair of bolts 31 located in opposite diagonal corners of the box and extending through the top of the latter where they are engaged by nuts 32. The bolts 31 engage opposite ends of a strap 33 which is secured to diagonally opposite corners of the uppermost timer frame plate 26 by nuts 34 threaded onto upward extensions of the appropriate bolts 27. Preferably, insulative washers 35 are placed between the strap 33 and the frame plate 26 and lock nuts 36 are provided on the bolts 31 at the strap 33. The portion of strap 33 between the nuts 34 is arched upwardly and serves as a limit or seat for the heat container 14. Atop the box 10 the bolts 31 have loosely mounted thereon below the nuts 32 each a finger 37 which extends up and over the rim of container 14, which rim it will be noted overlaps the lip of opening 12.

It will be seen, therefore, that the bolts 31 and nuts 32 serve to secure both the timer 15 and the heating container 14 in the box 10, but that, by manipulation of the fingers 37 the latter can be removed from the box without disturbing the fixed state of the former, and also that the upward arch of the center of strap 33 effectively spaces the heater 14 from the delicate springs and gearing of the timer 15 which might be damaged by excessive overheating.

The electric leads 20 and 21 from the heater coil 18 are connected respectively to the timer contact unit 29 and to one lead of a two lead cord 38 which extends through an opening 40 in the side wall of box 10 to an ordinary plug 41. A lead 20ᵃ connects the opposite side of contact unit 29 with the second lead of cord 38.

The operation of the device is as follows:

The box 10 is placed in a closet or other place to be demothed and the outlet cord 38 connected to a suitable source of electric power such as a wall socket. The pointer 25 then is rotated an amount appropriate to the time for which it is desired that heater coil 18 operate. As soon as the chemical 23 becomes sufficiently heated it gives off moth-killing vapor until the timing device turns off the heating unit.

It will be seen, therefore, that the device of the invention, once set, can be forgotten in safety.

Figure 6:
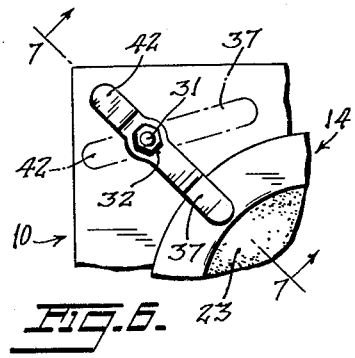
Fig. 6 is an enlarged, fragmentary plan view illustrating a slightly modified construction.
Figure 7:
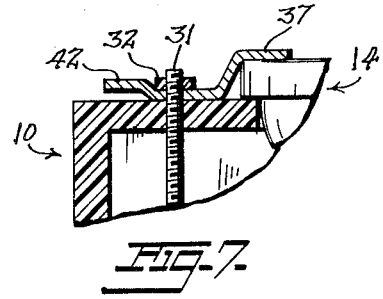
Fig. 7 is a fragmentary, vertical sectional view on line 7—7 of Fig. 6.

If desired, each of the fingers 37 may be provided with a tail 42 as shown in Figs. 6 and 7 to facilitate rotation of the finger to free heating unit 14 for removal from the box.

Figure 8:
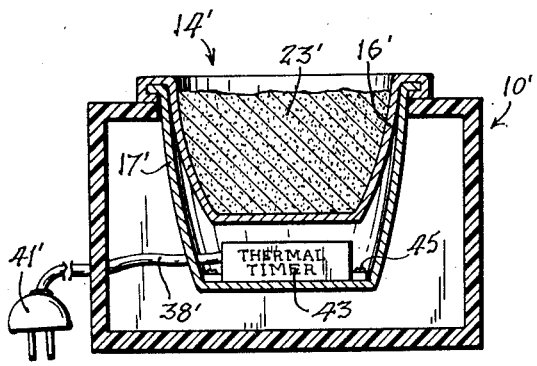
Fig. 8 is a vertical center sectional view of a modified form of the device.
Figure 9:
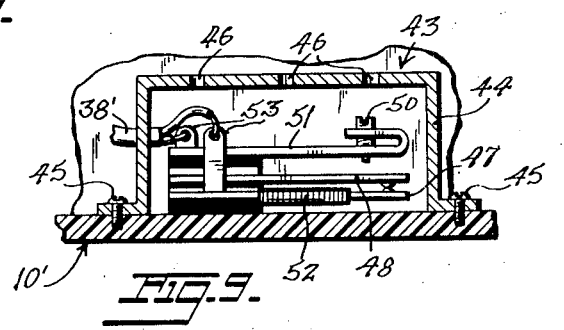
Fig. 9 is an enlarged sectional view of a portion of Fig. 8.

The modification of the invention shown in Figs. 8 and 9 has a different device for heating the contents of the container 14'. The heating device of this modified form of the invention comprises a thermal timer unit 43 mounted within the outer shell 17' beneath the inner shell 16' which contains the chemical 23' which is to be heated. Such thermal timer units are generally known by those skilled in the art and are available from the George Ulanet Company of 88 East Kinney Street, Newark 5, New Jersey.

As illustrated in Figs. 8 and 9, the thermal timer unit 43 has its operating parts enclosed within a casing 44 secured to the bottom wall of the outer shell 17' by several screws 45. The top wall of the casing 44 is formed with several holes 46 for the escape of heat. Within the casing 44 there is a normally closed switch composed of a fixed leaf 47 and a flexible leaf 48 which flexes between open and closed positions in response to increases and decreases in temperature. When the flexible leaf flexes to an open position, it contacts an adjustable stop 59 carried by a bracket 51. Wound upon the fixed leaf 47 there is a heater coil 52 insulated electrically from the leaf 47 but connected electrically to the contact of that fixed leaf. The other end of the heater coil is connected in the electric circuit to be energized when the switch is closed. The electric cord 38' for supplying the required electricity for operation of the thermal timer unit 43 is projected to the exterior of the rectangular box 10' and is provided with the usual plug 41'. Within the casing 44 of the thermal timer unit 43, the ends of the electric cord are connected to the contacts 53 of the unit. Further details of the construction and operation of the thermal timer unit 43 will not be given in this specification as such details form no part of the present invention and are generally known by those skilled in the art.

In all other respects the modified form of the invention is as described above.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A demothing device comprising a plastic box supported on short legs and having a circular opening in the top and another in the bottom, a heating pot removably mounted in the top opening and including inner and outer shells and a heating coil therebetween, a manually presettable timing device mounted in the bottom opening and including a pair of frame plates located within the box and corner bolts securing together and spacing apart said plates, a strap secured to the topmost plate by diagonally opposite ones of said bolts, said strap having an upwardly arched center portion atop which said outer shell sits spaced from the timing device, bolts secured to the ends of said strap and extending through the top of the box, means associated with said bolts for securing the heating pot removably in place, and electric circuit means for said coil controlled by said timing device.

2. A demothing device comprising a plastic box supported on short legs and having a circular opening in the top and another in the bottom, a heating pot removably mounted in the top opening and including inner and outer shells and a heating coil therebetween, a manually presettable timing device mounted in the bottom opening and including a pair of frame plates located within the box and corner bolts securing together and spacing apart said plates, a strap secured to the topmost plate by diagonally opposite ones of said bolts, said strap having an upwardly arched center portion atop which said outer shell sits spaced from the timing device, bolts secured to the ends of said strap and extending through the top of the box, nuts drawing up on the last said bolts to secure the timing device in place, fingers mounted on the last said bolts beneath said nuts and extending over the rim of the heating pot to secure the latter removably in place, and electric circuit means for said coil controlled by said timing device.

3. A demothing device comprising a plastic box supported on short legs and having a circular opening in the top and another in the bottom, a heating pot removably mounted in the top opening and including inner and outer shells and a heating coil therebetween, a manually presettable timing device mounted in the bottom opening and including a pair of frame plates located within the box and corner bolts securing together and spacing apart said plates, a strap secured to the topmost plate by diagonally opposite ones of said bolts, heat insulative washers between said strap and said upper plate, said strap having an upwardly arched center portion atop which said outer shell sits, the heater thus being spaced from the timing device, bolts secured to the ends of said strap and extending through the top of the box, nuts drawing up on the last said bolts to secure the timing device in place, electric circuit means for said coil controlled by said timing device, and fingers mounted on the last said bolts beneath said nuts and extending over the rim of said heating pot to secure the latter removably in place, said fingers having each a tail to facilitate disengagement thereof from the heating pot.

MAURICE ABRAMS.

References Cited in the file of this patent

UNITED STATES PATENTS

| Number | Name | Date |
|---|---|---|
| 1,158,330 | Stulp | Oct. 26, 1915 |
| 1,673,395 | Clark | June 12, 1928 |
| 1,702,480 | Newsom | Feb. 19, 1929 |
| 1,810,856 | Schnell | June 16, 1931 |
| 1,969,756 | Lowell | Aug. 14, 1934 |
| 1,982,358 | Smith | Nov. 27, 1934 |
| 2,088,728 | Stranszky | Aug. 3, 1937 |
| 2,541,637 | Christopher | Feb. 13, 1951 |